Sept. 18, 1956 G. J. MUCHER Re. 24,218

SWITCH

Original Filed Sept. 26, 1950 2 Sheets-Sheet 1

INVENTOR.
George J. Mucher
BY
Duell and Kane
ATTORNEYS

SWITCH

Original Filed Sept. 26, 1950 2 Sheets-Sheet 2

INVENTOR.
George J. Mucher
BY
Duell and Kana
ATTORNEYS

United States Patent Office

Re. 24,218

Reissued Sept. 18, 1956

24,218

SWITCH

George J. Mucher, Rochester, N. H., assignor to Clarostat Mfg. Co., Inc., Dover, N. H., a corporation of New York Original No. 2,642,506, dated June 16, 1953, Serial No. 186,864, September 26, 1950. Application for reissue June 24, 1954, Serial No. 439,172

4 Claims. (Cl. 200—67)

Matter enclosed in heavy brackets [ ] appears in the original patent but forms no part of this reissue specification; matter printed in italics indicates the additions made by reissue.

This invention relates to a functionally and structurally improved electrical switch.

It is an object to provide an apparatus of this character which may embody a two-pole, single-throw structure, and which will occupy only minimum space despite the fact that it may be employed under relatively high voltage and amperage potentials.

A further object is that of furnishing a switch mechanism which may readily be combined with and conveniently operated by assemblies as already existing on the market. Moreover, the device will be capable of manufacture by quantity production methods and will embody relatively few parts, each individually simple and rugged in construction; such parts being capable of ready assemblage and when so assembled furnishing a sturdy switch mechanism operating over long periods of time with freedom from all difficulties.

With these and other objects in mind, reference is had to the attached sheets of drawings, illustrating one practical embodiment of the invention and in which.

Figure 1:
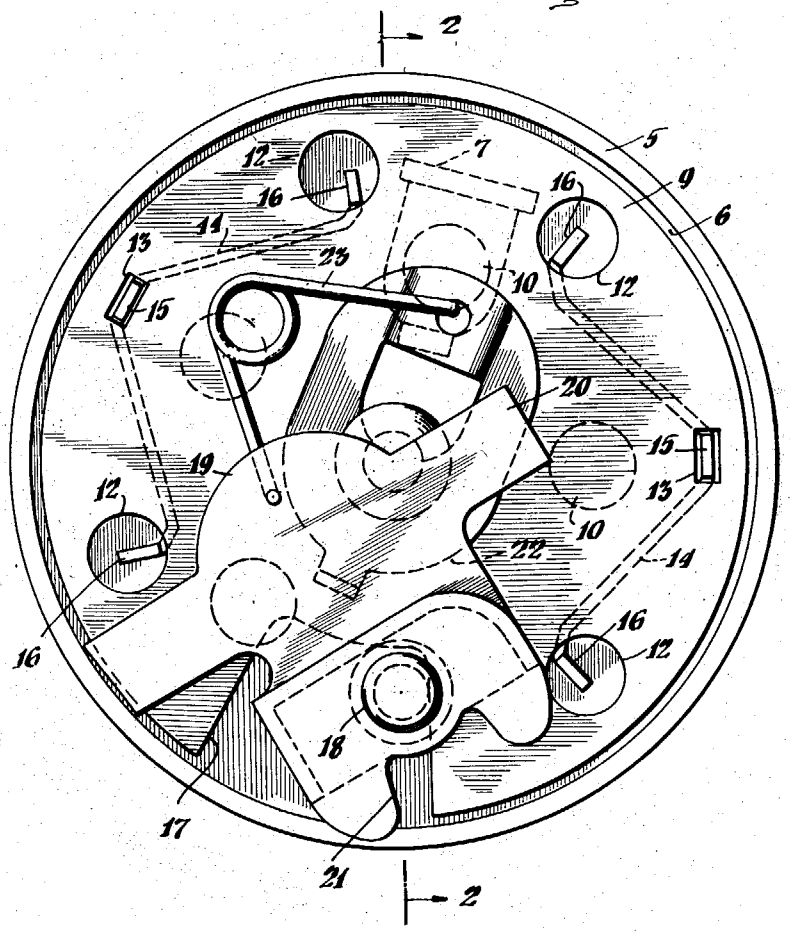
Fig. 1 is a face view of the apparatus, showing the parts adjusted to one position.
Figure 2:
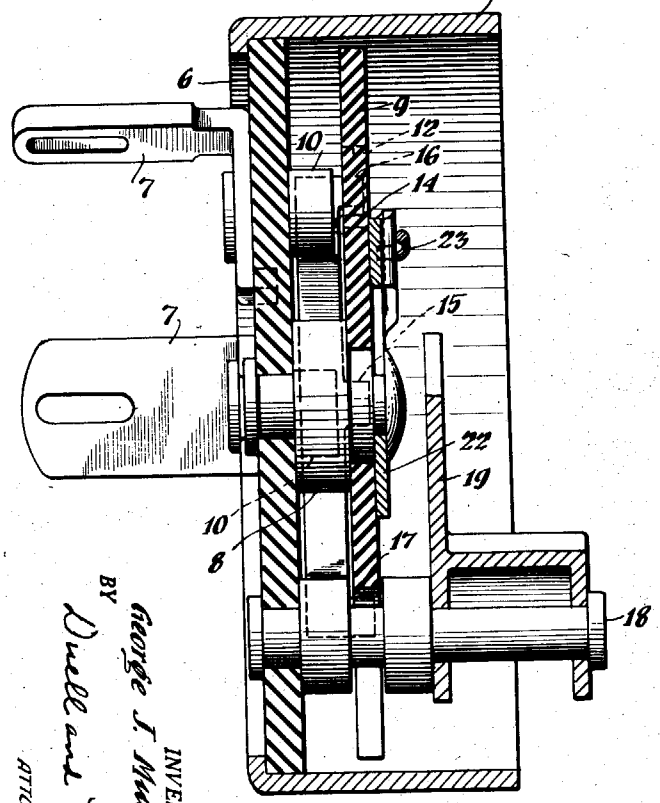
Fig. 2 is a transverse sectional view, taken along the lines 2—2 and in the direction of the arrows as indicated in Fig. 1.

In these views, the reference numeral 5 indicates a casing, the sidewalls of which are conveniently formed of metal, and the base 6 of which is preferably constructed of di-electric material. The latter has extending from it terminals 7 for connection with electric leads. Conveniently a unit of this type may be disposed to the rear of an assembly (not shown), which may include a variable resistance or similar structure. Therefore, the sidewall 5 may be provided with openings or tongues (which have not been illustrated), for the purpose of securing the switch casing in mounted position. Obviously, however, any desirable form of mounting structure might be employed.

Centrally of the base 6 a pivot member 8 is secured. This member rotatably supports a disc 9, also formed of di-electric material. Extending into the space existing between base 6 and this disc are pairs of spaced contacts 10 and 11. The disc is formed with pairs of openings 12, which are conveniently circular and between which slots or openings 13 of any desired configuration are provided. Pairs of spring contact arms are furnished by employing V-shaped members 14 of any desired cross-sectional configuration. These members are centrally formed with an upstanding portion 15 and with similar end portions 16.

The length of portions 15 may be equal to the length of openings 13. The length of portions 16 is less than the diameter of openings 12. With the parts embodying spring tension, it follows that with portion 15 in slot 13 and portions 16 in openings 12, the spring contacts will be retained in position. This will be because of the frictional engagement existing adjacent the ends of each of slots 13 and the fact that portions 16 bear against the edges of openings 12. Therefore, the spring contacts will be supported by and move with disc 9 as it revolves around pivot 8. Finally, it is to be noted, with respect to these parts, that the distance between the individual contacts of pairs 10 and 11 is substantially equal to the distance between the ends of the arms of spring contacts 14.

Now with a view to providing a suitable mechanism for shifting disc 9, it will be observed that the latter is conveniently formed with a cutout or notched portion 17. Secured to base 6, in line with this notch, is a stud or pivot member 18. Mounted adjacent the end of the latter is an actuator 19, conveniently embodying outwardly extending opposed arm portions 20, which, in conjunction with the sidewall 5, function as stops to limit the movements of the parts. Also forming a part of the actuator is a forked portion 21, which may be engaged by an arm or finger (not shown), so that the entire actuator may be oscillated around pivot 18.

Securing disc 9 in position is a retaining member 22, which bears against the outer face of the disc and extends into a groove formed in pivot 8 to prevent axial movement of the parts. A spring 23, conveniently formed of wire stock, is shaped to have a generally V configuration with a centrally coiled portion. The outer end of one arm of this spring is connected to the retaining member 22. The opposite end of the same is coupled to the actuator body, as especially shown in Figs. 1, 3 and 4. Therefore, a coupling is furnished between the actuator and disc 9.

In use it will be assumed that the casing of the switch has been suitably mounted and its terminals connected to electrical leads. Moreover, it will be assumed that an operating part extends adjacent the forked portion 21 of the actuator, and is capable of being manually or otherwise shifted. Of course, if this operating member be of special construction, then it may be desirable to modify or, in certain instances, eliminate forked portion 21. However, with the parts in the position shown in Fig. 1, it is apparent that the spring contacts 14 are out of electrical engagement with the fixed contacts 10 and 11. Therefore, the circuits will be open. This condition has been illustrated in Fig. 1.

Figure 3:
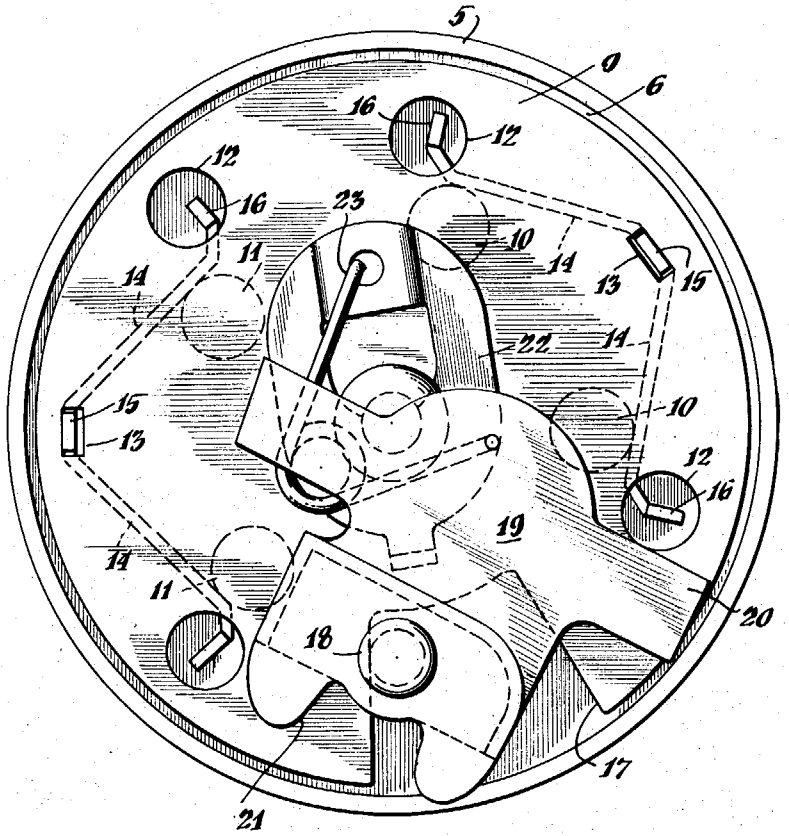
Fig. 3 is a view similar to Fig. 1, but showing the parts in their opposite extreme position.
Figure 4:
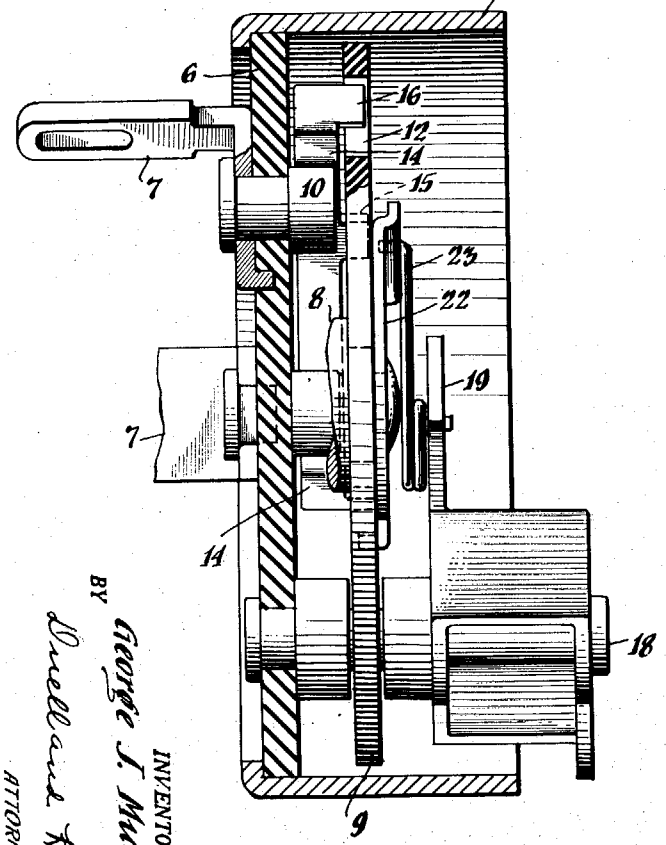
Fig. 4 is a view similar to Fig. 2, but illustrating the parts as shown in the position shown in Fig. 3.

If now actuator 19 is rocked around its stud or pivot 18 in a clockwise direction, it will be noted that the end of spring 23, which is connected to the actuator, will be shifted from the position shown in Fig. 1 to that illustrated in Fig. 3. The spring will be compressed as the parts thus move. This will be caused due to the diminishing distance occurring between the point of connection of the spring and actuator and the point of connection between the spring and retainer 22. When the former connection has passed beyond the axis of pivot 8 the spring will begin to exert a force against the retainer 22 and disc 9, such that it will tend to shift the latter in a counter-clockwise direction. It will, of course, be appreciated that under normal circumstances the swing of the actuator 19 occurs during a very brief interval. Therefore, the spring will quickly move through its dead-center position and exert thrust in the manner aforedescribed.

In any event, with such thrust exerted and disc 9 moving in a counter-clockwise direction, spring contact arms 14 will be carried to positions at which they will engage and bridge the gaps between pairs of contacts 10 and 11. This has been shown in Fig. 3. Also, as shown in this view, the spring arms, as they are engaged by the fixed contacts, will cam over the surfaces of the latter. This will be permitted because of the fact that end portions 16 have less width than the diameter of openings 12. Therefore, these end portions will assume final positions such as have been shown in Fig. 3. Due to the resilient nature of the spring contact arms, they will also function as shock absorbers to cushion the parts as the latter have reached final positions.

Obviously, a return movement of the parts from the positions shown in Fig. 3 to those illustrated in Fig. 1 is achieved by simply rocking the actuator in a counterclockwise direction. Again, the spring 23 will be compressed and shifted past dead-center position. Therefore, thrust will be exerted by that spring against disc 9, resulting in the latter being rapidly shifted in a clockwise direction. Under these circumstances, the spring arms will no longer bridge the spaces between contacts 10 and 11 and the circuits will again be open. Engagement between the edges of notch 17 and pivot 18 will limit movement of the disc 9. Due to the roundness and relatively thick contact members, the diagonal position of the contact arms, the curvature of one end of them and the arcuate sweep of the spring members, a compound or reciprocal wiping action occurs. Therefore, all scars or pittings due to arcing are corrected.

Thus, among others, the several objects of the invention, as specifically aforenoted, are achieved. Obviously, numerous changes in construction and rearrangements of the parts might be resorted to without departing from the spirit of the invention as defined by the claims.

I claim:

1. A switch including in combination a mounting, a disc, a support disposed centrally of said disc and mounting for pivotally supporting the disc with respect to the mounting, a pair of spaced contacts extending from said mounting towards said disc, said contacts being spaced substantially equally from said central support, contact engaging and bridging arms extending into a plane into which said contacts project, said arms being each disposed to extend tangentially in the direction of disc rotation and having their outer ends diverging and secured substantially against movement with respect to said disc at a point adjacent the periphery of the latter, their inner ends extending towards said central support and at least one of such ends having limited yielding movements with respect to said disc and means for rotating said disc with respect to said mounting to move said arms from a position at which one of said contacts intervenes the space between the same and is substantially bisected by a line radial to said central support and the outer arm ends to a position at which the outer end portion of one arm engages such contact; the outer end of the second arm yieldingly camming over the second contact of said pair during such disc rotation.

2. A switch including in combination a mounting, a disc, a support disposed centrally of said disk and mounting for pivotally supporting the disc with respect to the mounting, a pair of spaced contacts extending from said mounting towards said disc, said contacts being spaced substantially equally from said central support, a generally V-shaped member formed of yielding stock and being disposed in a plane into which said contacts project and having its crotch portion secured substantially against movement with respect to said disc at a point adjacent the periphery of the latter, the arms of said member extending tangentially to the direction of disc rotation, the ends of said arms extending towards said central support and at least the ends of one of said arms having limited yielding movement with respect to said disc and means for rotating said disc with respect to said mounting to move said arms from a position at which one of said contacts intervenes the space defined between the arms of said member and to be substantially bisected by a line radial to said support and the crotch of said member to a position at which the outer end portion of one arm engages said contact; the outer end of the other arm yieldingly camming over the second contact of said pair during such rotation.

3. A switch including in combination a mounting, a disc, a support disposed centrally of said disc and mounting for pivotally supporting the disc with respect to the mounting, two pairs of spaced contacts extending from said mounting towards said disc, said contacts being spaced substantially equally from said central support, two pairs of contact engaging and bridging arms extending into a plane into which said pairs of contacts project, said arms being tangential to the direction of disc rotation and having their outer ends diverging and secured substantially against movement with respect to said disc at points adjacent the periphery of the latter, the inner ends of each pair of arms extending towards said central support and at least one of the arms of each pair having limited yielding movement with respect to said disc and means for rotating said disc with respect to said mounting to move the arms of each pair from a position at which one of the contacts of each pair intervenes the space between the same and is substantially bisected by a line radial to said central support and the outer arm ends to a position at which the outer end portion of one arm of each pair engages its respective contact; the outer end of the second arm of each pair yieldingly camming over the second fixed contacts during such disc rotation.

*4. A switch including, in combination, a base element, a disc element, a pivot pin connecting the centers of said elements to restrict them to a movement solely rotational with respect to each other, said base element being stationary, said disc element being rotatable with respect thereto, said latter element being formed with a notch in its edge, a stud mounted by said base and engageable with the edges of said notch to limit the rotation of said disc, means to effect rotation of said elements including a member pivotally supported by said stud, arms extending outwardly from said member and means extending upwardly from said base to be engaged by said arms and thereby limit the rotation of said member, contact members of two types mounted one by each of said elements at points thereon such that certain of their parts have concentric paths of travel about said pivot pin as relative rotation of said elements occurs, one of said members comprising a spring arm having a part movable with respect to its mounting element, the other element fixedly supporting its member to wipingly engage and shift said spring arm and said arm extending in a direction defining an acute angle with respect to the arc of relative travel of said other contact member adjacent the point of initial engagement of said contact members.*

References Cited in the file of this patent or the original patent

UNITED STATES PATENTS

| | | |
|---|---|---|
| 2,215,816 | Hathorn | Sept. 24, 1940 |
| 2,235,366 | Haselwood | Mar. 18, 1941 |
| 2,286,162 | Schellenger | June 9, 1942 |
| 2,286,163 | Schellenger | June 9, 1942 |
| 2,304,479 | Schellenger | Dec. 8, 1942 |
| 2,441,924 | Steinback | May 18, 1948 |

FOREIGN PATENTS

| | | |
|---|---|---|
| 6,267 | Great Britain | Apr. 29, 1887 |
| 587,823 | France | Jan. 23, 1925 |